Patented Feb. 20, 1934

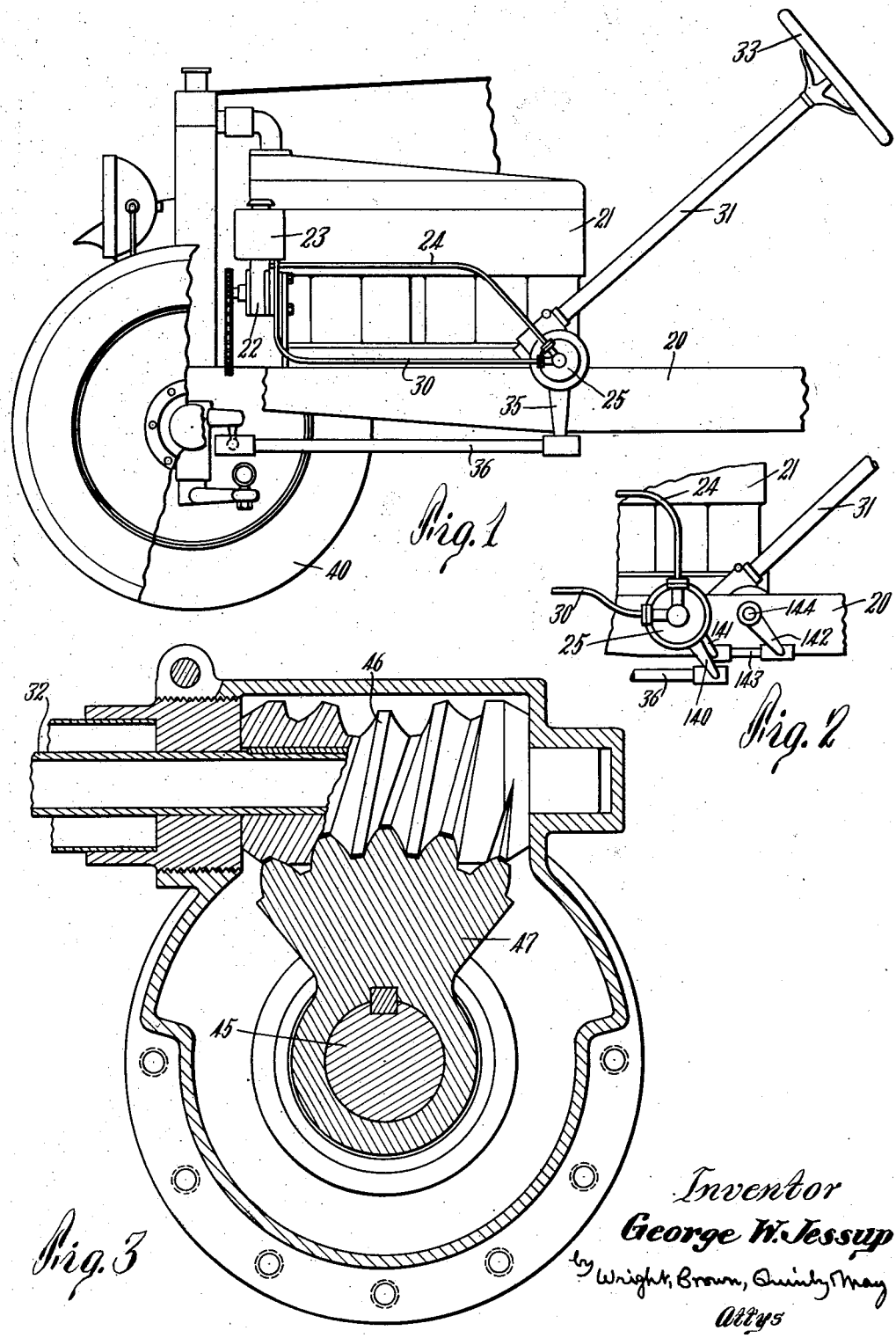
Feb. 20, 1934.  G. W. JESSUP  1,947,991
POWER STEERING GEAR AND ROTARY VALVE THEREFOR
Filed April 27, 1933  3 Sheets-Sheet 1
Inventor
George W. Jessup
by Wright, Brown, Quinby May
Attys

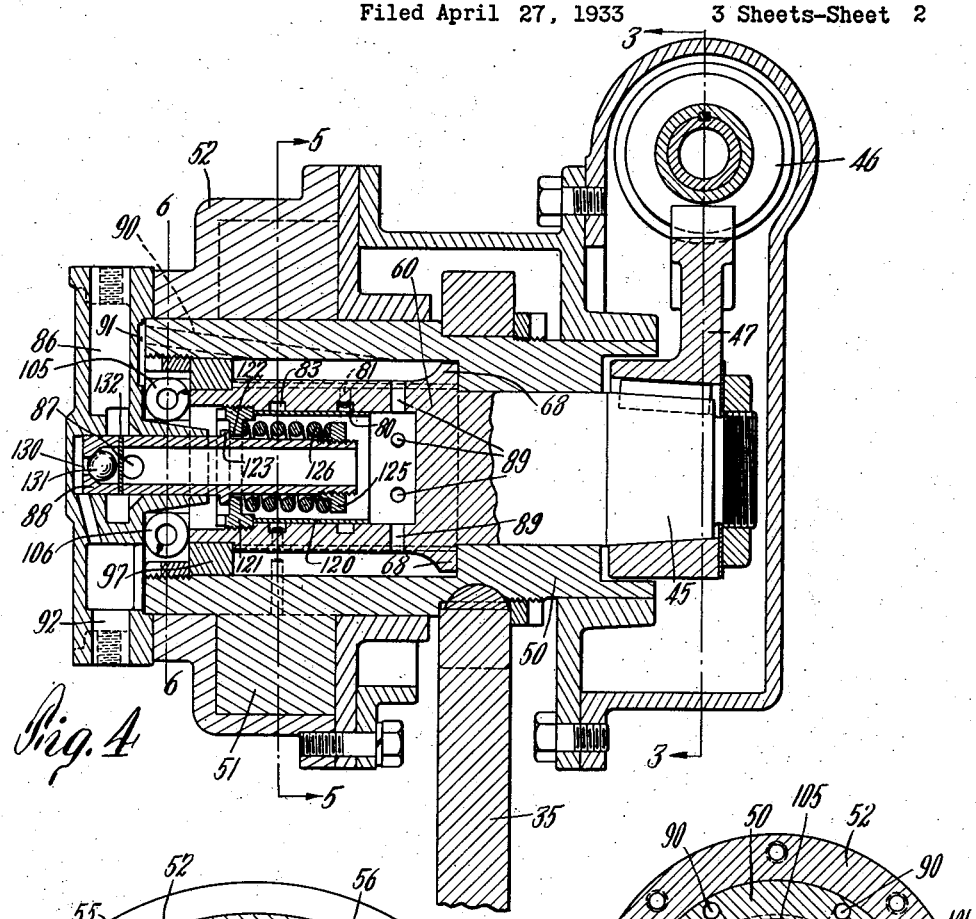

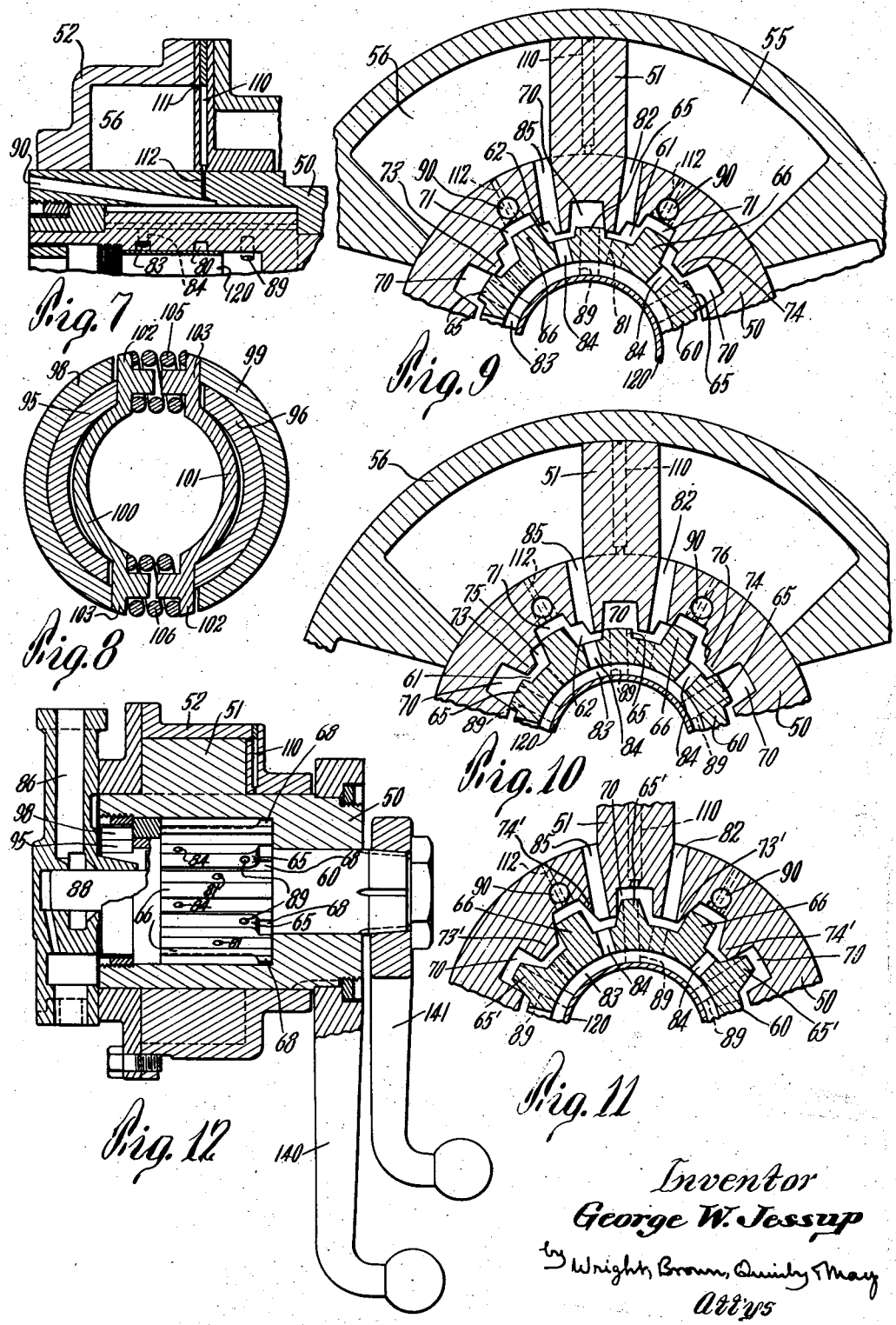

1,947,991

UNITED STATES PATENT OFFICE 1,947,991

POWER STEERING GEAR AND ROTARY VALVE THEREFOR

George W. Jessup, Waltham, Mass., assignor to Francis W. Davis, Waltham, Mass.

Application April 27, 1933. Serial No. 668,235

15 Claims. (Cl. 121—41)

This invention relates to power steering mechanism for vehicles such as automobiles, aeroplanes, and the like which is comparatively simple in structure, economical to manufacture, and positive in action.

The invention may be embodied, as illustrated on the drawings, in a compact power unit comprising two nested members rotatable on a common axis, one of said members being manually operable, the other member being a power member mechanically connected to a driven part, the two members being constructed to cooperate as valve members to control a flow of power fluid in such a way as to cause the power member to follow up any rotative movement by the manually operable member. These members have portions having faces which confront each other and are normally spaced apart for the passage of power fluid. Slight rotation of either member relative to the other results in positive engagement between mutually cooperating portions of the two members. This not only closes certain of the passages for power fluid, as hereinafter described, but also results in a positive mechanical engagement between the two members whereby the members rotate as a unit after the clearance between confronting portions has been taken up.

Partial reversibility of the gear is provided by so shaping and proportioning the two members that when fluid pressure is developed in the unit to cause follow-up movement in response to relative rotation between the members from their intermediate neutral relative position, a restoring force proportional to such pressure acts on the members tending to restore them to their neutral relative position. This restoring force may also be augmented by spring centering means for the purpose of introducing the proper amount of "feel" into the steering, and to cause the steering gear as a whole to operate as a hand gear unless and until steering resistance reaches a predetermined magnitude.

Various advantageous features will be apparent to one skilled in the art from the disclosure of the invention in the description thereof which follows and in the illustrations thereof which appear on the drawings, of which,—

Figure 1 is a fragmentary elevation of portions of an automobile showing a built-in embodiment of the invention.

Figure 2 is a fragmentary elevation showing an embodiment of the invention attached as an auxiliary mechanism rather than being originally built in.

Figure 3 is a section on the line 3—3 of Figure 4.

Figure 4 is a section of the steering mechanism shown in Figure 1, taken on a plane perpendicular to the steering post.

Figure 5 is a section on the line 5—5 of Figure 4.

Figure 6 is a section on the line 6—6 of Figure 4.

Fgure 7 s a fragmentary section of the mechanism showing an air relief port.

Figure 8 is a section of spring centering means shown in Figure 6, the parts being shown in a different position of operation.

Figures 9 and 10 are fragmentary sectional views showing portions of Figure 5, with the parts in different positions of operation, and angularly arranged as when actually installed.

Figure 11 is a fragmentary sectional view of a pair of valve members of slightly different form Figure 12 is a sectional view of an embodiment of the invention designed as an auxiliary attachment.

A steering mechanism power unit embodying the invention can readily be built into an automobile chassis, as illustrated in Figure 1, or can be built, as shown in Figures 2 and 12, for installation in a previously built automobile. In Figure 1 are illustrated a side frame 20 of an automobile, a motor 21, a pump 22 for power fluid, and a reservoir 23 for extra power fluid. For satisfactory operation of the steering gear, an incompressible fluid, such as oil, glycerine, or other equivalent liquid, is preferred. In the following description of the invention, the liquid employed in the system is referred to as oil, but it is understood that the invention is not limited to the use of any particular liquid or fluid. The pump 22 is connected as by a supply line 24 to a power unit 25. A discharge or return pipe 30 leads from the power unit back to the reservoir 23. A steering column 31 projects upwardly at a convenient angle from the power unit 25 and contains a suitable steering post 32 at the upper end of which is secured a manual steering wheel 33. Extending downwardly from the power unit 25 is a power arm 35 which is connected to a drag link 36, the latter being suitably connected to the forward wheels 40 of the vehicle by mechanism well known in the art, whereby when the power arm 35 is rocked the vehicle wheels 40 are deflected one way or the other to control the direction of movement of the automobile.

As shown in Figure 3, the steering post 32 may be mechanically connected to a cross shaft 45 as by a suitable worm 46 mounted on the post and meshing with a gear sector 47 keyed to the shaft 45. The cross shaft 45, instead of being keyed directly to the power arm 35, is connected indirectly through a rotor member 50, this member being keyed to the power arm 35. The rotor member 50 is a power-driven follow-up member which is adapted to follow the rotational movement of the cross-shaft 45 in either direction. A fluid-actuable motor of any desired or convenient type may be employed to drive the rotor 50, such motor being controlled by suitable valve mechanism hereinafter described. In the particular embodiment illustrated, the rotor 50 is itself a part of the motor and consists of a hollow cylinder having one or more radial vanes 51 extending outwardly therefrom. Three of these vanes are shown in the embodiment of the invention illustrated on the drawings. The portion of the rotor 50 from which the vanes 51 project is rotatable in a casing 52 which houses the working parts of the power unit 25, this casing being supplied with a series of fixed vanes 53 projecting inwardly therefrom to abut the surface of the rotor 50. As is evident from Figure 5, the vanes 51 and 53, together with the rotor 50 and the casing 52, form a series of chambers 55 and 56 which are variable in capacity by rotative movement of the rotor 50. The maximum angle of relative rotation between the rotor 50 and the casing 52 is determined by the vanes, since the fixed vanes 53 limit the range of movement of the rotary vanes 51. It is evident from Figure 5 that fluid pressure in the chambers 55 tends to rotate the rotor in a counterclockwise direction and fluid pressure in the chambers 56 tends to rotate the rotor in a clockwise direction. The provision of three rotary vanes 51 results in a relatively large total area upon which the fluid pressure may act. By increasing the number of vanes 51 and 53 the total area, and hence the total force exerted by the power fluid thereon, may be further increased. Since the rotor 50 is keyed directly to the power arm 35, rotation of the rotor 50 necessarily results in a rocking movement of the arm 35 and hence in a corresponding deflection of the vehicle wheels 40.

According to the invention improved valve mechanism is provided for controlling the fluid pressures within the chambers 55 and 56. When the steering wheel 33 is being held steady and there is no deflecting reaction upon the vehicle wheels 40, there is a balance of pressures in the chambers 55 and 56, these chambers being kept filled with oil. If this balance is disturbed, a resultant force is set up, acting on the valves 51 and tending to deflect the vehicle wheels 40. Valve mechanism for controlling the flow of oil into and out of the chambers 55 and 56 is illustrated in Figures 4 and 5. As shown, the cross shaft 45 is provided with a cylindrical extension 60 which serves as a valve member, the rotor 50 serving as a cooperating valve member. These valve members are nested hollow cylinders and may be referred to respectively as inner and outer cylinders. The inner cylinder 60 is supplied with a series of longitudinal external grooves 61 and 62 alternating around its periphery. These grooves define alternating longitudinal ribs 65 and 66. The ribs 65 may conveniently be of considerably less height than the ribs 66 for reasons hereinafter set forth. The interior wall of a portion of the outer cylinder 50 is formed with alternating longitudinal grooves 70 and 71, these grooves defining a series of alternating ribs 73 and 74. These ribs are preferably of equal height, but may be cut away on a portion of one flank, as shown at 75 and 76 in Figures 9 and 10, or bevelled on one side as shown in Figure 12. The ribs 65 and 66 of the inner cylinder 60 project toward the valleys of the grooves 70 and 71, respectively, the flanks of these ribs overlapping the sides of their respective opposing valleys (that is, the flanks of the ribs 73 and 74 of the outer cylinder) a short distance, say a few thousandths of an inch in the structure illustrated in Figures 9 and 10. The various ribs on the cylinders 50 and 60 are arranged with reference to the axes of these members in such a way that if the two members are relatively rotated in either direction, each rib of one member will simultaneously engage the overlapping flank portion of the adjacent rib of the other member, so that relative rotative movement between the cylinders 50 and 60 may be limited to a very small angle. As the distance of overlap of the flanks of adjacent ribs is preferably very small, I may increase the height of some or all of the ribs for a portion of their length to provide considerably greater overlap at the points of greater height so as to head off any tendency the engaging ribs might have to round off or deform the edges adjacent to the narrow areas of overlap. In the embodiment shown in Figures 9, 10 and 12 of the drawings, the low ribs 65 of the inner cylinder are made with high end portions 68 which overlap the flanks of the adjacent ribs 73 and 74 a considerably greater distance than do the low portions of the ribs 65.

When the two cylinders are in an intermediate neutral relative position, as illustrated in Figures 4 and 5, there is definite clearance between the flanks of each rib and the flanks of the ribs adjacent thereto. These clearances serve as oil passages for the flow of oil from one groove to another as is hereinafter described. The grooves 61 in the inner cylinder are constantly in communication with each other through a collecting groove 80 and connecting passage 81 extending thereto from the grooves 61. Each pressure chamber 55 is constantly in communication with one of the grooves 61 by a passage 82. Hence all of the chambers 55 are constantly in communication with each other and with all of the grooves 61. In like manner, all of the grooves 62 are constantly in communication with each other through a collecting groove 83 and connecting passages 84. Each of the pressure chambers 56 communicates with a groove 62 through a connecting passage 85. Hence increase of pressure in the grooves 61 means increase of pressure in all the chambers 55 and increase of pressure in the grooves 62 means increase of pressure in all the chambers 56.

The supply pipe 24 which leads from the pump 22 is connected to a fluid inlet 86, as in Figure 4. This inlet is connected through an opening 87 to the interior of a hollow stem 88 which opens into the interior of the valve member 60. Oil entering the interior of the valve member 60 flows through a series of radial passages 89 through the ribs 65 to enter the grooves 70. When the two cylinders 50 and 60 are in their neutral position, as shown in Figure 5, oil enters each groove 70 and divides into separate streams to flow through the clearances between the flanks of the ribs 65 and the adjacent ribs 73 and 74 into the adjoining grooves 61 and 62. From these grooves the oil flows through clearances between the adjacent ribs into the grooves 71. Each of the grooves 71 is connected by a passage 90 to a collecting groove 91 (Figure 4) which communicates with an outlet 92 to which the return pipe 30 is attached. Thus when the cylinders 50 and 60 are in their neutral relative position, there is a free flow of oil through the valve mechanism from the inlet 86 to the outlet 92. If a considerable number of ribs are provided as shown, a corresponding number of clearances between the ribs are present to provide passage for the oil from the supply grooves 70 to the discharge grooves 71. Hence the clearances may be individually small without appreciably restricting the free flow of oil through the valve mechanism. Small clearances result in a highly sensitive valve action.

The operation of the valve is illustrated in Figures 9 and 10. If, as shown in Figure 9, the inner cylinder 60 is rotated through a slight angle in a clockwise direction, the clearances on the opposite flanks of each rib, which are normally equal, become unbalanced so that in the extreme position the flank portion of each rib abuts the overlapping flank portion of the adjacent rib. Thus the flow of oil from each groove 70 into the adjacent groove 61 is diminished or cut off, whereas the clearance through which oil is permitted to flow from each groove 70 to the adjacent groove 62 is widened. This results in a reduction or cutting off of the oil supply from the chambers 55, the stream of oil being directed into the chambers 56, so that the relative pressures in these chambers become unbalanced, tending to cause the rotor 50 to move in a clockwise direction, that is, in a direction following the previous movement of the valve member 60. When the chambers 55 are cut off from the incoming stream of oil in the grooves 70, the clearances connecting these chambers with the grooves 71 and the outlet passages 90 are widened, thus facilitating the escape of oil from the chambers 55, such escape being necessary when the rotary vanes 51 swing in a clockwise direction. As shown in Figure 10, rotation of the valve member 60 in a counterclockwise direction reduces or cuts off the incoming streams of oil in the grooves 70 from the adjacent grooves 62 and directs these streams into the adjacent grooves 61 so that the incoming oil is forced into the chambers 55 and is cut off from the chambers 56. This disturbs the balance of pressures and results in an excess pressure in the chambers 55 tending to rotate the rotor 50 in a counterclockwise direction, that is, the direction of previous rotation of the valve member 60. Thus the oil acts to bring about a follow-up movement on the part of the rotor when the valve member 60 is rotated relatively thereto.

According to the present invention the building up of pressure in the chamber 55 or the chamber 56 results not only in a follow-up action of the rotor 50 but also a reaction on the valve member 60 tending to center it again, that is, to restore it to its neutral position relative to the rotor 50. This reaction or centering effect is brought about by inequality between areas of rib flanks exposed to the oil under pressure in such a way as to tend to rotate the rotor 60 in one direction, and the areas exposed in such a way as to tend to rotate the rotor in the opposite direction. In the embodiment of the invention illustrated in Figures 9 and 10 the ribs 65 are made lower than the ribs 66 so that they overlap the flanks of adjacent ribs 73 and 74 by only a few thousandths of an inch. Portions of the other flanks of the ribs 73 and 74 are cut away so that only the end portion of the high ribs 66 will come in actual overlapping contact with these flanks. Hence, when the parts are as shown in Figure 9, the oil pressure in the grooves 70 and 62 resulting from relative rotation between the members 50 and 60, and acting against the relative large exposed flank areas of the ribs 66, tends to rotate the valve member 60 in a counterclockwise direction. This oil pressure also presses on the smaller exposed flank areas of the ribs 65 tending to rotate the member 60 in a clockwise direction. The resultant torque is counterclockwise, that is, in a direction to restore the member 60 to its neutral position relative to the member 50. This same effect can be secured by other equivalent structures such as that illustrated in Figure 11. As therein shown, the ribs 65', instead of being lower than the ribs 66, may be made with sloping flanks so that when the ribs 65' engage adjacent ribs 73' or 74' of the member 50, the portion of each rib 65' which actually projects into a groove 70 has both its flanks exposed to the same oil pressure, so that the resultant lateral force on the rib results from oil pressure on the remaining portion of one of the ribs, this remaining portion being substantially equal in area to a flank of one of the short ribs 65 shown in Figures 9 and 10. Furthermore, the sides of the grooves 71 (i. e., flanks of the ribs 73' and 74'), instead of being partly cut away as shown in Figures 9 and 10, may be sloped as shown in Figure 11. Thus, when the ribs 66 engage the ribs 73' or 74', the whole flank of each rib 66 is exposed to the oil pressure. Hence, a centering torque is set up, tending to restore the valve members to their neutral position. It is evident that this torque is proportional to the pressure of the oil in the grooves 70.

In addition to the centering tendency on the part of the oil pressure, I preferably provide mechanical centering means as illustrated in Figures 6 and 8. To this end the valve member 60 is provided at one end with a pair of extensions 95, 96, each of these extensions being a little less than a semi-cylinder. Fixed within the adjacent end portion of the rotor 50 is a ring 97 having a pair of projections 98 and 99 concentric with the projections 95 and 96 and slidably fitted thereon. Between the projections 95 and 98 on the one side and the projections 96 and 99 on the other side are a pair of slippers 100, 101, each of which consists of a cylindrical portion terminating in flat end portions 102 and 103, the edges of the extensions 95, 96, 98 and 99 normally abutting the flat portions 102, 103, as shown in Figure 6. Between opposed flat portions of the slippers are suitable compression springs 105 and 106. These springs are ordinarily under a predetermined compression so that any movement of the flat portions 102 and 103 of the slippers 100 and 101 toward each other must be caused by sufficient force to overcome the initial compression of the springs 105 and 106. The operation of the centering means is illustrated in Figure 8. As therein shown, relative rotation of the cylinders 50 and 60 results in relative rotation between the extensions 95, 96 and 98, 99. Assuming, for example, that the valve member 60 is rotated in a clockwise direction as indicated in Figure 8, the extensions 95 and 96 move the end portions 102 of the slippers in a clockwise direction so that these end portions move away from contact with the adjacent edges of the extensions 98 and 99. The end portions 103 of the slippers are held against similar motion by the contacting edges of the extensions 98 and 99. As a result, the springs 105 and 106 are necessarily compressed. Thus a resilient restoring force is always active when the cylinders 50 and 60 are relatively rotated from their neutral position.

The centering action of the oil pressure in the grooves 61 and 62, and of the springs 105 and 106, has the important function of providing "feel" to the steering gear as a whole by making it partially reversible. In a completely irreversible mechanism, road reactions tending to deflect the vehicle wheels are entirely absorbed by the power unit so that the operator has an objectionable "detached" feeling, and the gear is not self-righting after the vehicle has made a turn. By the use of centering means such as herein described and illustrated, road shocks and other road reactions are transmitted to the steering wheel, but in greatly reduced intensity. The springs 105 and 106 are preferably installed under compression, the amount of such compression being controlled by selection of springs with suitable stiffness and original length. It is evident that resistance to steering effort must be of a sufficient magnitude to compress both springs 105 and 106 beyond their initial compression before there can be any relative movement of the valve cylinders 50 and 60 which is necessary to bring fluid power into play. In other words, the springs 105 and 106 prevent relative angular movement between the cylinders 50 and 60 in response to a torque which is less than the minimum required to overcome the substantial initial resistance of the springs. It is desirable ordinarily to select springs 105 and 106 with stiffness and initial compression such that on a smooth road with only moderate curves the valve cylinders 50 and 60 move as a unit and the pressure balance between the chambers 55 and 56 is not disturbed. Under such circumstances the steering gear functions like, and has all the well-known advantages of, an ordinary hand-steering gear. When steering resistance increases beyond the critical point, as by road reaction caused by a rut, obstruction or a sharp turn, the slight relative rotation between the valve cylinders causes an instant response in the pressure chambers 55 and 56 so that the extra steering resistance is entirely absorbed by the action of the power fluid, except for small extra force which is necessary for the additional compressing of the springs 105 and 106 and which is transmitted to the steering wheel to produce "feel".

It is desirable, for sensitive response of the mechanism, that the fluid system be as free as possible from any gas or other elastic medium. Hence it is desirable that the chambers 55 and 56 be free from any bubbles of gas which may tend to accumulate therein. As shown in Figures 7 and 9, a wall of the casing surrounding the power unit is provided with a passage 110 having a small opening 111 connecting it with the interior of the casing, preferably at a point which will be the highest point of the casing when the power unit is installed in an automobile as indicated in Figure 1. The lower end of the passageway 110 is customarily closed by the exterior surface of the rotor 50, the opening 111 being ordinarily closed by a vane 51. As shown in Figures 7 and 9, small passages 112 are drilled through the wall of the rotor 50 from the outer surface thereof to the two uppermost discharge passages 90, the outer orifices of these passages 112 being so located as to register with the passage 110 when the rotor 50 is in certain angular positions one side or the other of its central position as illustrated. Thus when the rotor, in the process of rotating, is moved a sufficient angle in either direction from its central position, it reaches a position in which the chamber 55 or the chamber 56 is directly in communication with the discharge passage 90 through the small opening 111, the passage 110 and one or the other of the passages 112. Since the opening 111 is preferably of small diameter, the amount of oil which will escape therethrough is negligible but any air which may be present will be quickly exhausted to the discharge outlet, being forced through the hole 111 by the oil pressure within the chamber. Whenever the steering gear is turned sufficiently to round a corner, this air escape is opened up at least momentarily. Hence, at frequent intervals in the ordinary operation of the steering gear, opportunity for escape of air from within the casing is provided. Thus when the steering gear is put into service for the first time, it is only necessary to fill the reservoir 23 and allow the oil to circulate through the system. As the oil enters the chambers 55 and 56 it tends to force the air therein up to the uppermost portion of the casing, whence it is quickly discharged through the air vent 110 into the discharge line and is swept along to the reservoir. In assembling the mechanism, the casing 52 is arranged so that when the mechanism is installed for use, one of the vanes 51 will be vertical when in its normal position, and the opening 111 will be behind the vane 51 at the uppermost point of the interior of the casing.

In order to avoid excessive pressures within the apparatus which might result in injury, I provide a spring-loaded safety valve which can be adjusted to relieve excess pressure in the supply line. As shown in Figure 4, this relief valve may conveniently be located within the interior of the valve member 60. As shown, a sleeve 120 is mounted within the interior of the valve member 60, this sleeve serving to separate the collecting grooves 80 and 83 from the interior of the valve member 60. This sleeve is held in place by a threaded ring 121 having an inwardly extending flange 122 against which seats an exterior flange 123 formed on the hollow stem 88 through which oil is supplied from the inlet 86 to the interior of the valve member 60. On the inner end portion of the stem 88 is threaded a collar 125, a compression spring 126 being mounted around the inner portion of the stem between the fixed flange 122 and the collar 125. This spring acts to hold the flange 123 seated against the flange 122. In case of excessive pressure within the valve member 60, such pressure will act upon the stem 88 to push the flange 123 away from the seat 122 against the pressure of the spring 126. This permits oil within the interior of the valve member 60 to ecape through a clearance between the sides of the stem 88 and the flange 122 directly into the discharge groove 91 and the outlet 92.

If the oil pump is out of order or is disconnected for any reason so that a stream of oil is not supplied to the power unit, the gear acts as an ordinary hand-steering gear, there being a slight backlash due to the clearance between the flanks of the ribs on the valve member 60 and the ribs on the rotor 50. Hand operation of the steering gear, however, varies the capacities of the chambers and necessitates a flow of oil out of one set of chambers and into the other set of chambers each time the rotor is moved. Since hand operation of the gear results in closing one set of clearances in the valve before motion of the rotor is started, the connecting passages between the two sets of chambers are cut off and one set of chambers must draw oil from the supply line while the other set of chambers is discharging oil into the discharge line. Hence, under such conditions there is a tendency to cause suction in the inlet 86 and pressure in the outlet 92. In order to relieve such suction or pressure difference, I may provide a simple check valve, as shown in Figure 4. This may consist of an opening 130 in the outer end of the stem 88, a ball check 131 being normally seated in the opening. A pin 132 may be provided to keep the ball 131 near its seat. Since in the ordinary operation of the gear the oil pressure in the inlet 86, and hence within the stem 88, exceeds the pressure in the outlet 92, this pressure then keeps the ball 131 on its seat. Any excess pressure in the outlet 92 over that in the inlet 86 is at once relieved through the opening 130.

In Figures 2 and 12 a booster form of power unit embodying the invention is illustrated. The working parts of this mechanism are exactly as hereinbefore described so that detailed description thereof is not here repeated. Keyed to the rotor 50 is a power arm 140 which, in turn, is connected to the drag link 36. Keyed to the valve member 60 is a drop arm 141 which is connected to a drop arm 142 as by suitable links 143. The drop arm 142 is mounted on a cross shaft 144 rotatable by actuation of the steering wheel 33 through any suitable connection such as the worm and gear connection illustrated in Figure 3. This form of power unit is designed for installation in automobiles having a previously installed manual steering gear. The operation of the booster type is identical with the operation of the built-in type of power unit illustrated in Figure 1.

It is evident that many modifications and changes may be made in the particular embodiments of the invention herein shown and described without departing from the spirit or scope thereof as defined in the following claims.

I claim:

1. In a power steering mechanism having an inlet and an outlet for power fluid, a casing member and a partition member therein forming a pair of opposed pressure chambers, one of said members being movable relatively to the other in either direction from a normal intermediate position by unbalanced pressures in said chambers and being directly connectible with the steered part of the vehicle, valve means comprising two nested cylinders, one of which is rotatable in step with the movement of said movable member, the other cylinder being connectible with the steering wheel of a vehicle for manual rotation thereby, said cylinders being relatively rotatable with respect to each other through a small angle, the outer of said cylinders having a set of longitudinal ribs on its inner surface, the inner cylinder having a set of longitudinal ribs loosely meshing with the ribs of the outer cylinder, flank portions of the ribs of each set being simultaneously engageable by flank portions of the ribs of the other set by relative rotation of said cylinders from a normal relative position in which there are clearances between opposing flank portions of successive ribs, said mechanism having normally open passages including said clearances to connect both said chambers with the inlet and the outlet, whereby the relative pressures in said chambers are controlled by variations in said clearances.

2. In a power steering mechanism having an inlet and an outlet for power fluid, a casing member and a partition member therein forming a pair of opposed pressure chambers, one of said members being movable relatively to the other in either direction from a normal intermediate position by unbalanced pressures in said chambers and being directly connectible with the steered part of the vehicle, valve means comprising two nested cylinders, one of which is rotatable in step with the movement of said movable member, the other cylinder being connectible with the steering wheel of a vehicle for manual rotation thereby, said cylinders being relatively rotatable with respect to each other through a small angle, the outer of said cylinders having a set of longitudinal ribs on its inner surface, the inner cylinder having a set of longitudinal ribs loosely meshing with the ribs of the outer cylinder, flank portions of the ribs of each set being simultaneously engageable by flank portions of the ribs of the other set by relative rotation of said cylinders from a normal relative position in which there are clearances between opposing flank portions of successive ribs, said mechanism having normally open passages including said clearances to connect both said chambers with the inlet and the outlet, whereby the relative pressures in said chambers are controlled by variations in said clearances, the flanks of said ribs being so shaped that fluid pressure resulting from relative rotation between the cylinders reacts on the rib flanks exposed thereto with a resultant torque on the cylinders in a direction to restore said cylinders to their neutral relative position.

3. In a power steering mechanism having an inlet and an outlet for power fluid, a casing member and a partition member therein forming a pair of opposed pressure chambers, one of said members being movable relatively to the other in either direction from a normal intermediate position by unbalanced pressures in said chambers and being directly connectible with the steered part of the vehicle, valve means comprising two nested cylinders, one of which is rotatable in step with the movement of said movable member, the other cylinder being connectible with the steering wheel of a vehicle for manual rotation thereby, said cylinders being relatively rotatable with respect to each other through a small angle, the outer of said cylinders having a set of longitudinal ribs on its inner surface, the inner cylinder having a set of longitudinal ribs loosely meshing with the ribs of the outer cylinder, flank portions of the ribs of each set being simultaneously engageable by flank portions of the ribs of the other set by relative rotation of said cylinders from a normal relative position in which there are clearances between opposing flank portions of successive ribs, said mechanism having normally open passages including said clearances to connect both said chambers with the inlet and the outlet, whereby the relative pressures in said chambers are controlled by variations in said clearances, the flanks of said ribs being so shaped that fluid pressure resulting from relative rotation between the cylinders reacts on the rib flanks exposed thereto with a resultant torque on the cylinders in a direction to restore said cylinders to their neutral relative position and spring means for preventing relative angular movement between said cylinders in response to a torque less than a substantial predetermined minimum.

4. In a power steering mechanism having an inlet, an outlet, two opposed pressure chambers and normally open passages connecting the inlet and outlet with both chambers and with each other, valve structure comprising a pair of nested cylinders, the outer cylinder having internal longitudinal valleys and ribs, the inner cylinder having external longitudinal valleys and ribs loosely meshing with the ribs of the outer cylinder whereby the ribs of one cylinder simultaneously engage the ribs of the other cylinder when the cylinders are relatively rotated through a small angle in either direction from an intermediate neutral position in which there is clearance between the opposing flanks of successive ribs and there is clearance between the crests of each rib and the trough of the radially opposite valley, alternate valleys in said outer cylinder being in communication respectively with said inlet and said outlet, alternate valleys in said inner cylinder being in communication respectively with said opposed pressure chambers, said ribs being so shaped that the ribs of the inner cylinder present unequal flank areas to the action of fluid pressure in certain of said valleys when the cylinders are relatively rotated from their neutral position, the inequality of presented areas being such as to cause the cylinders to tend to return to their neutral relative position.

5. In a power steering mechanism having an inlet, an outlet, two opposed pressure chambers and normally open passages connecting the inlet and outlet with both chambers and with each other, valve structure comprising a pair of nested cylinders, the outer cylinder having internal longitudinal valleys and ribs, the inner cylinder having external longitudinal valleys and ribs loosely meshing with the ribs of the outer cylinder whereby the ribs of one cylinder simultaneously engage the ribs of the other cylinder when the cylinders are relatively rotated through a small angle in either direction from an intermediate neutral position in which there is clearance between the opposing flanks of successive ribs and there is clearance between the crests of each rib and the trough of the radially opposite valley, alternate valleys in said outer cylinder being in communication respectively with said inlet and said outlet, alternate valleys in said inner cylinder being in communication respectively with said opposed pressure chambers, said ribs being so shaped that the ribs of the inner cylinder present unequal flank areas to the action of fluid pressure in certain of said valleys when the cylinders are relatively rotated from their neutral position, the inequality of presented areas being such as to cause the cylinders to tend to return to their neutral relative position and spring means for preventing relative angular movement between said cylinders in response to a torque less than substantial predetermined minimum.

6. In a power steering mechanism having an inlet, an outlet, two opposed pressure chambers and normally open passages connecting the inlet and the outlet with both chambers and with each other, valve structure comprising a pair of nested cylinders, the outer cylinder having interior longitudinal ribs, the inner cylinder having longitudinal ribs of alternately greater and less heights loosely meshing with the ribs of the outer cylinder whereby relative rotation between said cylinders is limited to a small angle in either direction from an intermediate neutral position in which there are clearances between all the radially overlapping surface portions of successive ribs, said clearances constituting portions of said passages connecting said inlet, outlet and pressure chambers, whereby relative rotative movement between said cylinders varies the clearances between overlapping lateral surfaces of adjacent ribs to regulate relative fluid pressures in said chambers when fluid under pressure is supplied through said inlet, one of said cylinders being positively and directly rotated by the other when the ribs of one contact with the ribs of the other.

7. In a power steering mechanism having an inlet, an outlet, two opposed pressure chambers and normally open passages connecting said inlet and outlet with both said chambers and with each other, valve means controlling the relative pressures in said chambers, and means comprising a pair of nested cylinders rotatable together by unbalanced pressures in said chambers, the outer of the cylinders having a series of longitudinal ribs of equal height on its inner surface, said ribs alternating with longitudinal grooves, the inner cylinder having a series of longitudinal ribs on its outer surface alternating with grooves, the ribs on the inner cylinder being alternately of greater and lesser heights, the ribs of each set loosely meshing with the ribs of the other set whereby the ribs of one set are laterally engageable by the ribs of the other set when the cylinders are relatively rotated through a small angle in either direction from an intermediate neutral position in which there are clearances between the opposing flanks of successive ribs, the crest of each rib of each cylinder being radially opposite to and spaced from the trough of a groove in the other cylinder, alternate grooves in the outer cylinder being constantly in communication respectively with said inlet and said outlet, alternate grooves in the inner cylinder being constantly in communication respectively with said opposed pressure chambers, whereby the flow of power fluid into and out of said chambers is controlled by variations in the clearances between the overlapping portions of the flanks of said ribs.

8. In a power steering mechanism having an inlet, an outlet, two opposed pressure chambers and normally open passages connecting said inlet and outlet with both said chambers and with each other, valve means controlling the relative pressures in said chambers, and means comprising a pair of nested cylinders rotatable together by unbalanced pressures in said chambers, the outer of the cylinders having a series of longitudinal ribs on its inner surface, said ribs alternating with longitudinal grooves, the inner cylinder having a series of longitudinal ribs on its outer surface alternating with grooves, the ribs of each set loosely meshing with the ribs of the other set whereby the ribs of one set are laterally engageable by the ribs of the other set when the cylinders are relatively rotated through a small angle in either direction from an intermediate neutral relative position in which there are clearances between the opposing flanks of successive ribs, the crest of each rib of each cylinder being radially opposite to and spaced from the trough of a groove in the other cylinder, alternate grooves in the outer cylinder being constantly in communication respectively with said inlet and said outlet, alternate grooves in the inner cylinder being constantly in communication respectively with said opposed pressure chambers, whereby the flow of power fluid into and out of said chambers is controlled by variations in the clearances between the overlapping portions of the flanks of said ribs, the flanks of said ribs being so shaped that fluid pressure resulting from relative rotation between the cylinders reacts on the rib flanks exposed thereto with a resultant torque on the cylinders in a direction to restore said cylinders to their neutral relative position.

9. In a power steering gear, a mechanism comprising a cylindrical casing with fixed vanes projecting inwardly, a hollow rotor member coaxial with said casing and rotatable therein through a limited angle, said rotor member being mechanically connected with the steered portion of a vehicle, vanes on said rotor forming with said fixed vanes a series of substantially fluid-tight chambers within said casing, said rotor having interior longitudinal ribs and grooves, a cylindrical valve member within said rotor mechanically connectible with the steering wheel of a vehicle, said valve member having external longitudinal ribs and grooves loosely meshing with the ribs within the rotor and of alternately greater and lesser height, said rotor and valve member being relatively rotatable through a small angle in either direction from an intermediate neutral position in which there is a substantially continuous clearance between the inner surfaces of the rotor and the outer surfaces of the valve member, said mechanism having therein a fluid inlet, a fluid outlet, and passages including said clearance normally connecting said inlet and outlet with all said chambers, said passages being alterable by relative movement between said rotor and valve member from said neutral position to direct fluid pressure into certain of said chambers to act on the rotor vanes in a direction tending to restore said rotor to its neutral position relative to said valve member.

10. In a power steering gear, a mechanism comprising a cylindrical casing with fixed vanes projecting inwardly, a hollow rotor member coaxial with said casing and rotatable therein through a limited angle, said rotor member being mechanically connected with the steered portion of a vehicle, vanes on said rotor forming with said fixed vanes a series of substantially fluid-tight chambers within said casing, said rotor having interior longitudinal ribs and grooves, a cylindrical valve member within said rotor mechanically connectible with the steering wheel of a vehicle, said valve member having external longitudinal ribs and grooves loosely meshing with the ribs within the rotor, whereby flank portions of the ribs of the valve members are simultaneously engageable respectively by flank portions of the ribs of the rotor, said rotor and valve member being relatively rotatable through a small angle in either direction from an intermediate neutral position in which there is a substantially continuous clearance between the inner surfaces of the rotor and the outer surfaces of the valve member, said mechanism having therein a fluid inlet, a fluid outlet, and passages including said clearance normally connecting said inlet and outlet with all said chambers, said passages being alterable by relative movement between said rotor and valve member from said neutral position to direct fluid pressure into certain of said chambers to act on the rotor vanes in a direction tending to restore said rotor to its neutral position relative to said valve member, the flanks of said ribs being so shaped that fluid pressure resulting from relative rotation between the cylinders reacts on the rib flanks exposed thereto with a resultant torque on the cylinders in a direction to restore said cylinders to their neutral relative position.

11. Valve mechanism for a power steering gear or the like, comprising a casing having a fluid inlet, an outlet, and a series of fixed inwardly projecting vanes, a hollow cylindrical rotor within said casing, said rotor having outwardly projecting vanes forming with said casing and rotor two sets of opposed pressure chambers of variable capacity according to the angular position of the rotor relative to the casing, said rotor also having a series of inner longitudinal ribs of equal height and grooves between the ribs, a hollow cylindrical valve member nested within the rotor and provided with ribs and grooves radially opposite respective grooves and ribs of the rotor, the ribs of the valve member being of alternately greater and lesser height and projecting part way into the grooves of the rotor, the ribs and grooves being so arranged that flank portions of all of the ribs engage flank portions of adjacent ribs simultaneously when the rotor and valve member are relatively rotated in either direction through a small angle, a combined supply pipe and relief valve leading from said inlet to the interior of said valve member, said rotor and valve member having therein passages constantly connecting alternate rotor grooves with the interior of the valve member and with said outlet and constantly connecting alternate valve member grooves respectively with the two sets of pressure chambers, and means actuable to rotate said valve member relatively to said rotor.

12. Valve mechanism for controlling fluid pressures in a pair of pressure chambers and having an inlet, an outlet, and a pair of passages for communication with respective pressure chambers, said valve mechanism comprising a pair of nested cylinders, the outer cylinder having a series of longitudinal ribs and grooves on its inner surface, the inner cylinder having a series of longitudinal ribs and grooves on its outer surface radially aligned with respective grooves and ribs of the outer cylinder, the ribs of each cylinder projecting part way into the grooves of the other cylinder so that portions of the flanks of each rib overlap portions of the adjacent ribs, the ribs being arranged so that the ribs of each cylinder simultaneously engage the ribs of the other cylinder on their flanks when the cylinders are relatively rotated through a small angle in either direction, said cylinders having passages therein for constant communication between alternate grooves of one of the cylinders and said inlet and outlet respectively, and for constant communication between alternate grooves of the other cylinder and respective pressure chambers, and means actuable to rotate one of said cylinders in either direction.

13. Valve mechanism for controlling fluid pressures in a pair of pressure chambers and having an inlet, an outlet, and a pair of passages for communication with respective pressure chambers, said valve comprising a pair of nested hollow cylinders, the outer cylinder having a series of longitudinal ribs and grooves on its inner surface, the inner cylinder having a series of longitudinal ribs and grooves on its outer surface radially aligned with respective grooves and ribs of the outer cylinder, the ribs of one cylinder being of substantially equal height, the ribs of the other cylinder being of alternately greater and lesser heights, the ribs of each cylinder projecting part way into the grooves of the other cylinder so that portions of the flanks of each rib overlap portions of the adjacent ribs, the ribs being arranged so that the ribs of each cylinder simultaneously engage the ribs of the other cylinder on their flanks when the cylinders are relatively rotated through a small angle in either direction, said cylinders having passages therein for constant communication between alternate grooves of one of the cylinders and said inlet and outlet respectively, and for constant communication between alternate grooves of the other cylinder and respective pressure chambers, and means actuable to rotate one of said cylinders in either direction.

14. Valve mechanism for controlling fluid pressures in a pair of pressure chambers and having an inlet, an outlet, and a pair of passages for communication with respective pressure chambers, said valve mechanism comprising a pair of nested cylinders, the outer cylinder having a series of longitudinal ribs and grooves on its inner surface, the inner cylinder having a series of longitudinal ribs and grooves on its outer surface radially aligned with respective grooves and ribs of the outer cylinder, the ribs of each cylinder projecting part way into the grooves of the other cylinder so that portions of the flanks of each rib overlap portions of the adjacent ribs, the ribs being arranged so that the ribs of each cylinder simultaneously engage the ribs of the other cylinder on their flanks when the cylinders are relatively rotated through a small angle in either direction, said cylinders having passages therein for constant communication between alternate grooves of one of the cylinders and said inlet and outlet respectively, and for constant communication between alternate grooves of the other cylinder and respective pressure chambers when the cylinders are in their normal relative angular position, spring means for preventing relative angular movement between said cylinders in response to a torque less than a substantial predetermined minimum, and means actuable to rotate one of said cylinders in either direction.

15. Valve mechanism for controlling fluid pressures in a pair of pressure chambers and having an inlet, an outlet, and a pair of passages for communication with respective pressure chambers, said valve comprising a pair of nested hollow cylinders, the outer cylinder having a series of longitudinal ribs and grooves on its inner surface, the inner cylinder having a series of longitudinal ribs and grooves on its outer surface radially aligned with respective grooves and ribs of the outer cylinder, the ribs of one cylinder being of substantially equal height, the ribs of the other cylinder being of alternately greater and lesser heights, the ribs of each cylinder projecting part way into the grooves of the other cylinder so that portions of the flanks of each rib overlap portions of the adjacent ribs, the ribs being arranged so that the ribs of each cylinder simultaneously engage the ribs of the other cylinder on their flanks when the cylinders are relatively rotated through a small angle in either direction, said cylinders having passages therein for constant communication between alternate grooves of one of the cylinders and said inlet and outlet respectively, and for constant communication between alternate grooves of the other cylinder and respective pressure chambers when the cylinders are in their normal relative angular position, spring means for preventing relative angular movement between said cylinders in response to a torque less than a substantial predetermined minimum, and means actuable to rotate one of said cylinders in either direction.

GEORGE W. JESSUP.